(12) United States Patent
Grossman et al.

(10) Patent No.: US 9,626,365 B2
(45) Date of Patent: Apr. 18, 2017

(54) CONTENT CLUSTERING SYSTEM AND METHOD

(71) Applicants: Andrew Grossman, Hopkins, MN (US); Kenneth F. Krutsch, Minnetonka, MN (US); Richard Monson-Haefel, Edina, MN (US)

(72) Inventors: Andrew Grossman, Hopkins, MN (US); Kenneth F. Krutsch, Minnetonka, MN (US); Richard Monson-Haefel, Edina, MN (US)

(73) Assignee: Ambient Consulting, LLC, Minneapolis, MN (US)

( * ) Notice: Subject to any disclaimer, the term of this patent is extended or adjusted under 35 U.S.C. 154(b) by 721 days.

(21) Appl. No.: 13/832,177

(22) Filed: Mar. 15, 2013

(65) Prior Publication Data

US 2014/0280122 A1   Sep. 18, 2014

(51) Int. Cl.
*G06F 17/30* (2006.01)

(52) U.S. Cl.
CPC .............................. *G06F 17/30029* (2013.01)

(58) Field of Classification Search
CPC ......... G06F 17/30056; G06F 17/30265; G06F 17/30029
USPC ................................. 707/733; 715/771, 243
See application file for complete search history.

(56) References Cited

U.S. PATENT DOCUMENTS

| | | | |
|---|---|---|---|
| 7,673,248 B2 | 3/2010 | Narayanaswami | |
| 8,234,586 B2 | 7/2012 | Glein | |
| 8,327,284 B2 | 12/2012 | Marusich et al. | |
| 8,515,460 B2 * | 8/2013 | Greenberg | G06F 17/30265 455/418 |
| 8,645,855 B2 | 2/2014 | Marusich et al. | |
| 8,745,057 B1 | 6/2014 | Li | |
| 8,745,617 B1 * | 6/2014 | Stekkelpak | G06F 9/44505 717/173 |
| 8,856,375 B2 * | 10/2014 | Martinez | H04W 4/02 709/223 |
| 8,879,890 B2 * | 11/2014 | Luo | G06F 17/30056 386/248 |
| 8,963,962 B2 | 2/2015 | Ubillos | |
| 9,009,159 B2 | 4/2015 | Bernhardt et al. | |
| 9,009,596 B2 | 4/2015 | Ortiz | |
| 9,043,276 B2 | 5/2015 | Kiilerich et al. | |
| 9,460,057 B2 * | 10/2016 | Grossman | G06F 17/212 |
| 2004/0064351 A1 * | 4/2004 | Mikurak | G06Q 10/087 705/22 |

(Continued)

OTHER PUBLICATIONS

Oct. 4, 2016 USPTO Office Action (U.S. Appl. No. 13/832,744).

(Continued)

*Primary Examiner* — Jean M Corrielus
(74) *Attorney, Agent, or Firm* — Beck Tysver Evans, PLLC

(57) ABSTRACT

A computerized system and method are presented that creates implicit content on a mobile device by monitoring and recording input from sensors on the device. Metadata from the implicit content and from user-created content is then analyzed the purpose of event identification. Using the metadata and event identification, the content is created into clusters, which can be confirmed by the user as actual events. Events can then be grouped according to metadata and event information into a presentation grouping.

20 Claims, 8 Drawing Sheets

(56) References Cited

U.S. PATENT DOCUMENTS

| | | |
|---|---|---|
| 2004/0177149 A1 | 9/2004 | Zullo et al. |
| 2004/0210480 A1 | 10/2004 | Muller |
| 2006/0178918 A1* | 8/2006 | Mikurak ............ G06Q 10/06 705/7.25 |
| 2007/0136773 A1 | 6/2007 | O'neill et al. |
| 2008/0032739 A1* | 2/2008 | Hoodbhoy ............ G06Q 30/02 455/556.2 |
| 2008/0109718 A1 | 5/2008 | Narayanaswami |
| 2009/0249249 A1 | 10/2009 | Glein |
| 2009/0259654 A1 | 10/2009 | Yamamoto |
| 2009/0325602 A1* | 12/2009 | Higgins ............... H04W 4/02 455/456.2 |
| 2009/0327288 A1 | 12/2009 | Silverman et al. |
| 2009/0328087 A1* | 12/2009 | Higgins ............... H04N 7/173 725/10 |
| 2010/0082239 A1 | 4/2010 | Hardy et al. |
| 2010/0088297 A1 | 4/2010 | Kiilerich et al. |
| 2010/0175001 A1 | 7/2010 | Lazarus et al. |
| 2010/0251101 A1 | 9/2010 | Haussecker et al. |
| 2011/0167357 A1* | 7/2011 | Benjamin ......... H04M 1/72572 715/753 |
| 2011/0249953 A1 | 10/2011 | Suri et al. |
| 2011/0251868 A1* | 10/2011 | Mikurak ............ G06Q 10/06 705/7.25 |
| 2012/0042036 A1* | 2/2012 | Lau ..................... G06F 8/61 709/217 |
| 2012/0054660 A1 | 3/2012 | Marusich et al. |
| 2012/0116559 A1* | 5/2012 | Davis ..................... G06F 3/002 700/94 |
| 2012/0117473 A1 | 5/2012 | Han et al. |
| 2012/0210220 A1 | 8/2012 | Pendergast et al. |
| 2012/0213493 A1* | 8/2012 | Luo ................ G06F 17/30056 386/248 |
| 2012/0224743 A1* | 9/2012 | Rodriguez ............ G06T 11/60 382/103 |
| 2012/0240142 A1 | 9/2012 | Rose |
| 2012/0259722 A1* | 10/2012 | Mikurak ............ G06Q 10/087 705/26.1 |
| 2013/0132836 A1 | 5/2013 | Ortiz |
| 2013/0144847 A1 | 6/2013 | Spurlock |
| 2013/0159868 A1 | 6/2013 | Marusich et al. |
| 2013/0198602 A1 | 8/2013 | Kokemohr |
| 2013/0238724 A1 | 9/2013 | Cunningham |
| 2013/0238990 A1 | 9/2013 | Ubillos et al. |
| 2013/0239031 A1 | 9/2013 | Ubillos et al. |
| 2013/0239055 A1 | 9/2013 | Ubillos |
| 2013/0239063 A1 | 9/2013 | Ubillos et al. |
| 2013/0275880 A1* | 10/2013 | Bachman ............ G06F 3/0481 715/751 |
| 2013/0343618 A1 | 12/2013 | Zomet et al. |
| 2014/0068433 A1* | 3/2014 | Chitturi ............ H04N 21/41407 715/716 |
| 2014/0101149 A1 | 4/2014 | Winters et al. |
| 2014/0122471 A1* | 5/2014 | Houston ............ G06F 17/3089 707/731 |
| 2014/0140675 A1* | 5/2014 | de Sa ............... H04N 21/21805 386/223 |
| 2014/0236709 A1* | 8/2014 | Aguayo ............ G06Q 30/0241 705/14.44 |
| 2014/0281929 A1* | 9/2014 | Grossman ............ G06F 17/212 715/243 |
| 2014/0282179 A1* | 9/2014 | Grossman ............ G06F 3/0484 715/771 |

OTHER PUBLICATIONS

Mar. 20, 2016 USPTO Office Action (U.S. Appl. No. 13/947,016).
Dec. 17, 2015 USPTO Office Action (U.S. Appl. No. 13/834,347).
Jun. 2, 2015 USPTO Office Action (U.S. Appl. No. 13/832,744).
Feb. 17, 2016 USPTO Office Action (U.S. Appl. No. 13/832,744).

* cited by examiner

CONTENT CLUSTERING SYSTEM AND METHOD

FIELD OF THE INVENTION

The present application relates to the field of computerized systems that analyze content on mobile devices for the purpose of clustering content together.

SUMMARY

An embodiment of the present invention creates implicit content on a mobile device by monitoring and recording input from sensors on the device. This embodiment also analyzes metadata from the implicit content and metadata from explicit content created by a user for the purpose of creating content clusters, which are confirmed by the user as actual events. Events can then be grouped according to metadata and event information into a presentation grouping.

DETAILED DESCRIPTION

System Overview

Figure 1:
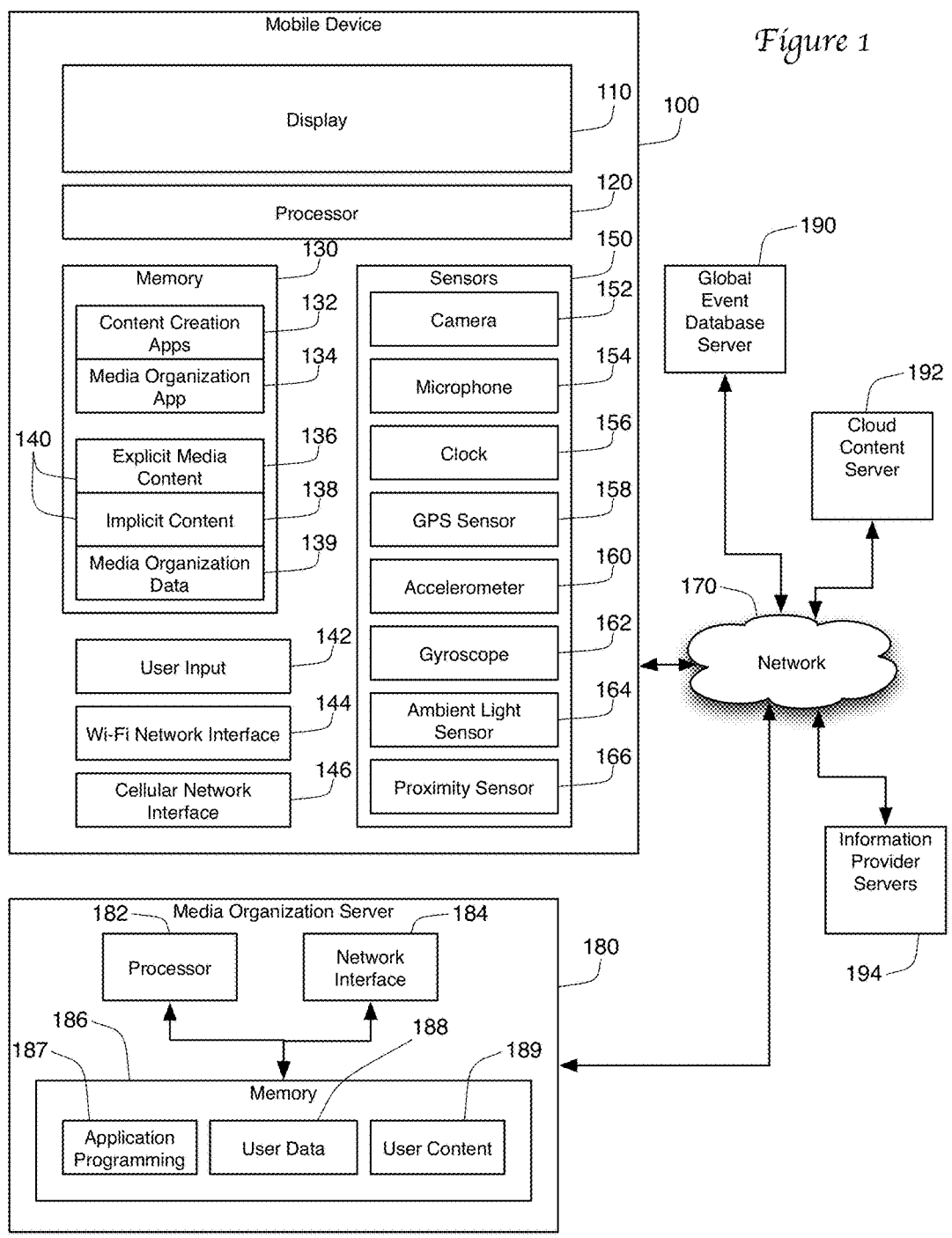
FIG. 1 is a schematic diagram showing a mobile device and a plurality of servers communicating over a network.

FIG. 1 shows a mobile device 100 utilizing one embodiment of the present invention. The mobile device 100 can communicate over a wide area network 170 with a plurality of computing devices. In FIG. 1, the mobile device 100 communicates with a media organization server 180, a global event database server 190, one or more cloud content servers 192, and a third-party information provider server 194.

The mobile device 100 can take the form of a smart phone or tablet computer. As such, the device 100 will include a display 110 for displaying information to a user, a processor 120 for processing instructions and data for the device 100, a memory 130 for storing processing instructions and data, and one or more user input interfaces 142 to allow the user to provide instructions and data to the mobile device 100. The display 110 can be use LCD, OLED, or similar technology to provide a color display for the user. In some embodiments, the display 110 incorporates touchscreen capabilities so as to function as a user input interface 142. The processor 120 can be a general purpose CPU, such as those provided by Intel Corporation (Mountain View, Calif.) or Advanced Micro Devices, Inc. (Sunnyvale, Calif.), or a mobile specific processor, such as those designed by ARM Holdings (Cambridge, UK). Mobile devices such as device 100 generally use specific operating systems designed for such devices, such as iOS from Apple Inc. (Cupertino, Calif.) or ANDROID OS from Google Inc. (Menlo Park, Calif.). The operating systems are stored on the memory 130 and are used by the processor 120 to provide a user interface for the display 110 and user input devices 142, handle communications for the device 100, and to manage applications (or apps) that are stored in the memory 130. The memory 130 is shown in FIG. 1 with two different types of apps, namely content creation apps 132 and a media organization app 134. The content creation apps 132 are apps that create explicit media content 136 in the memory 130, and include video creation apps, still image creation apps, and audio recording apps. The media organization app 134 creates implicit content 138. The media organization app 134 is responsible for gathering the different types of explicit media content 136 and the implicit content 138 (referred to together as content 140), analyzing the content 140, and then organizing the content 140 into clusters, events, and presentation groupings that are stored in media organization data 139 as described below.

The mobile device 100 communicates over the network 170 through one of two network interfaces, namely a Wi-Fi network interface 144 and a cellular network interface 146. The Wi-Fi network interface 144 connects the device 100 to a local wireless network that provides connection to the wide area network 170. The Wi-Fi network interface 144 preferably connects via one of the Institute of Electrical and Electronics Engineers' (IEEE) 802.11 standards. In one embodiment, the local network is based on TCP/IP, and the Wi-Fi network interface includes TCP/IP protocol stacks. The cellular network interface 146 communicates over a cellular data network. The provider of the cellular data network then provides an interface to the wide area network 170. In one embodiment, the wide area network 170 is the Internet.

The mobile device 100 uses sensors 150 for a variety of purposes on the device 100. In the present embodiment, the sensors 150 provide the means to create media content 136. The content creation apps 132 respond to signals from the user input 142 to capture media content 136 using the camera sensor 152 and the microphone 154. These types of media content 136 are known as "explicit media content" because the user has explicitly requested that the mobile device 100 capture and store this media content 136. For instance, a user might instruct a photo taking app 132 to take a still photograph using the camera 152, or to stitch together a stream of input from the camera sensor 152 into a panorama image that is stored as explicit media content 136. A movie app 132 might record input from the camera 152 and microphone 154 sensors as a video file 136. Or a voice memo app 132 might record input from the microphone sensor 154 to create an audio media content file 136. In each case, these content creation apps 132 respond to an explicit request from a user to create the media content 136. In most cases, the explicit media content 136 is stored as a file or a data record in the memory 130 of the mobile device 100. This file or data record includes both the actual content recorded by the sensors 150 and metadata associated with that recording. The metadata will include the date and time at which the media content 136 was recorded, as determined by the clock 156. Frequently, the metadata also includes a geographic location where the media content 136 was created. The geographic location can be determined from the GPS sensor 158, or by using other location identifying techniques such as identifying nearby Wi-Fi networks using the Wi-Fi Network Interface 144, or through nearby cell tower identification using the cellular network interface 146. Some content creation apps 132 will include facial recognition capabilities in order to tag the identity of individuals within a photo or video file 136. Other apps 132 will allow a user a manually tag their files 136 so as to identify the individuals (or "participants") portrayed in those media files 136. These identity tags can then be added to the metadata stored with the media content file 136 in memory 130.

In some embodiments, the explicit media content 136 will be stored remotely on a cloud content server 192. For example, all photographs taken by the camera 152 may be stored in memory 130 as explicit media content 136 and may also be transmitted over one of the network interfaces 144, 146 to the cloud content server 192. The locally stored explicit media content 136 may be temporary in nature, with permanent storage provided on the cloud content server 192. In some circumstances, the cloud content server 192 will be provided by a third party, such as the FLICKR service provided by Yahoo! Inc. of Sunnyvale, Calif.

The media organization app 134 creates implicit content 138 by monitoring the sensors 150 on the mobile device 100 and storing related data as implicit content 138 when it monitors an interesting change in the sensors 150. For instance, the media organization app 134 might be monitoring the GPS sensor 158 and accelerometer 160 during a family driving vacation from Chicago, Ill. to Yellowstone National Park in Wyoming. The accelerometer 160 can indicate when the family car stops, and then determine the location of the mobile device 100 using the GPS sensor 158. By monitoring the accelerometer 160 and the GPS sensor 158 (at least periodically), the media organization app 134 can determine that the car was stopped during this family vacation for 3 hours, 15 minutes in Wall, S. Dak. This data could be stored as implicit content 138 in the memory 130.

When the app 134 creates this implicit content 138, it may also uses one of the network interfaces 144, 146 to obtain additional information about this implicit content 138. For example, the app 134 may contact a global event database server 190 that contains information about a great number of events (or "occurrences"). This type of database server 190, which is provided by several third parties over the Internet 170, allows users to specify a geographic location and a time, and the server 190 will respond with information about occurrences happening near that location around that time. The information returned from the global event database server will generally include a title for the occurrence, a description for that occurrence, a time period during which that occurrence takes place, and an exact physical location for that occurrence. For example, during the stop in Wall, S. Dak., the app 134 may inquire whether there are any events happening in Wall at the time the vehicle was stopped. The event database server 190 may indicate that at this time, a parade was happening in downtown Wall. The app 134 may also make inquiries from different information provider servers 194, such as a server 194 that provides weather information for a particular geographic location. By acquiring this information from external database sources 190, 194, the media organization app 134 would be able to create implicit content 138 indicating that from 12:15 to 3:30 pm on Jul. 4, 2013, the user of the mobile device 100 stopped in Wall, S. Dak. and witnessed a parade in sunny, 92 degree weather.

The media organization app 134 can take advantage of any of the sensors 150 on the mobile device 100, including the camera 152, microphone 154, clock 156, GPS sensor 158, accelerometer 160, gyroscope 162, ambient light sensor 164, and proximity sensor 166. The app 134 can define monitoring modes that determine the extent to which it monitors the various sensors 150. For instance, in one monitoring mode the app 134 could provide reverse geocoding by periodically (or continually) recording a location for the user from the GPS sensor 158. In another mode, the app 134 could monitor the accelerometer to indicate when the user is moving or has stopped moving. In a third mode, the app 134 could periodically monitor the microphone 154. If no interesting noises are detected, the app 134 would wait for the next interval before it again monitored the microphone 154. If interesting noises were detected (e.g., noises that were characteristic of human voices), the app 134 could record a small amount of the conversation and record it as implicit content 138 in memory 130, along with the time and location at which the conversation was recorded. In a fourth mode, the use of another app, such as one of the content creation apps 132, triggers the creation of an implicit content file 138. For instance, the use of a photo or movie app 132 may cause the media organization app 134 to record the GPS location, the current weather, and the current event, if any, noted by the global event database server 190. In addition, the app 132 in this fourth mode may record sounds from the microphone 154 to capture conversations between the user of the mobile device 100 and her photography subjects. These conversations would be stored as implicit content 138 in memory 130.

When requested by the user, the media organization app 134 collects the content 140 from the memory 130 (and from cloud content servers 192) and organizes the content 140 into content clusters. Content clusters are groups of content 140 that are grouped together as belonging to a particular occurrence or event. As described below, content clusters are presented to the user for modification and verification, after which the content groupings are referred to as user-verified events. Events may involve numerous elements of content 140, or may involve only a single element of content 140. In the preferred embodiment, the content clusters and events are stored in media organization data 139. In addition, the content clusters and events could be stored on a media organization server 180 accessible by the mobile device 100 over the network 170.

The media organization server 180 contains a programmable digital processor 182, such as a general purpose CPU manufactured by Intel Corporation (Mountain View, Calif.) or Advanced Micro Devices, Inc. (Sunnyvale, Calif.). The server 180 further contains a wireless or wired network interface 184 to communicate with remote computing devices, such as mobile device 100, over the network 170. The processor 182 is programmed using a set of software instructions stored on a non-volatile, non-transitory, computer readable medium 186, such as a hard drive or flash memory device. The software typically includes operating system software, such as LINUX (available from multiple companies under open source licensing terms) or WINDOWS (available from Microsoft Corporation of Redmond, Wash.).

The processor 182 performs the media organization functions of server 180 under the direction of application programming 187. Each user of the server 180 is separately defined and identified in the user data 188. The media organization app 134 can assist the user in creating an account on the media organization server 180. The account can require a username and password to access user content 189 that is stored on the server 180 on behalf of the users identified in data 188. The media organization server 180 can operate behind the media organization app 134, meaning that the user of the mobile device 100 need only access the server 180 through the user interface provided by the app 134. In addition, the media organization server 180 can provide a web-based interface to the user content 189, allowing a user to access and manipulate the user content 189 on any computing device with web access to the Internet 170. This allows users to organize their user content 189 and format presentations of that data 189 via any web browser.

Because the media organization server 180 contains information about content clusters and events created by a number of users, this server 180 can easily create its own database of past occurrences and events that could be useful to the media organization app 134 when clustering media. For instance, a first user could cluster media about a parade that they witnessed between 12:30 and 1:30 pm in Wall, S. Dak. on Jul. 4, 2013. The user could verify this cluster as a user-verified event, and could add a title and description to the event. This data would then be uploaded to the user data 188 on server 180. At a later time, a mobile device 100 of a second user could make an inquiry to the media organization server 180 about events that occurred in downtown Wall, S. Dak. at 1 pm on Jul. 4, 2013. The server 180 could identify this time and location using the event created by the previous user, and return the title and description of the event to the mobile device 100 of the second user. In effect, the media organization server 180 could become a crowd-sourced event database server providing information similar to that provided by server 190 (except likely limited to past and not future events).

Content Handling

Figure 2:
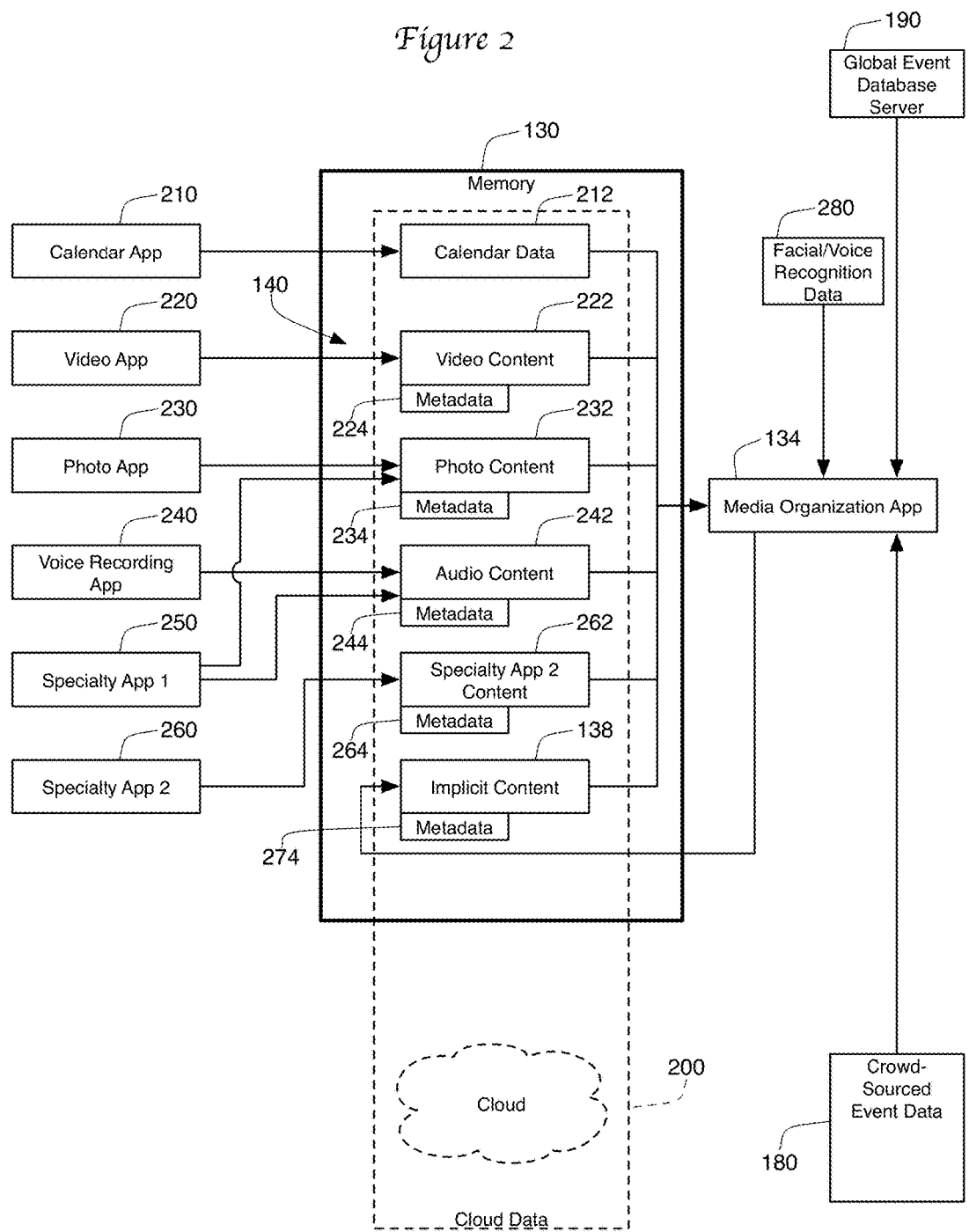
FIG. 2 is a schematic diagram of showing an application accepting input to form a content cluster.

FIG. 2 schematically illustrates the interaction of the media organization app 134 with content 140 and the other inputs that allow the media organization app 134 to create content clusters. In one embodiment, the content 140 is found in the physical memory 130 of the mobile device 100. In another embodiment, this data 140 is found on "the cloud" 200, meaning that the data is stored on remote servers 180, 192 accessible by the mobile device 100 over network 170. The dual possible locations for this content 140 is shown in FIG. 2 by locating the data 140 both within memory box 130 and the dotted cloud storage box 200.

The explicit media content 136 shown in FIG. 2 includes video content 222, photo content 232, and audio content 242. The video content 222 is created by a video app 220 running on the processor 120 of the mobile device 100. When the video content 222 is created, it is stored along with metadata 224 that describes the video content 222, including such information as when and where the video was created. Similarly a photo app 230 creates the photo content 232 and its related metadata 234, and a voice recording app 240 creates audio content 242 and metadata 244. These three apps 220, 230, 240 may be standard apps provided along with the mobile operating system when the user purchased the mobile device 100. The data 222, 232, 242 from these apps 220, 230, 240 are stored in known locations in the local memory 130 or on the cloud data system 200.

Third party or specialty apps 250, 260 can also create explicit content 136 that is accessed by the media organization app 134. The first specialty app 250 creates both photo content 232 and audio content 242, and stores this data 232, 242 and related metadata 234, 244 in the same locations in memory 130 where the standard apps 230, 240 provided with the device 100 store similar data. The second specialty app 260 also creates explicit media content 262 and related metadata 264, but this content 262 is not stored in the standard locations in memory 130. However, as long as the media organization app 134 is informed of the location of this specialty app content 262 on memory 130, such content 262 can also be organized by the app 134.

In addition to the explicit content 222-262, the media organization app 134 also organizes implicit content 138 and its metadata 274. In one embodiment, this implicit content 138 is created by the same app 134 that organizes the content 140 into content clusters. In other embodiments, the media organization app 134 is split into two separate apps, with one app monitoring the sensors 150 and creating implicit content 138, and the other app 134 being responsible for organizing content 140.

FIG. 2 also shows a calendar app 210 creating calendar data 212 on the mobile device 100. In one embodiment, this data can be used by the media organization app 134 as it arranges content 140 into content clusters. As explained below, the calendar data 212 may have explicit descriptions describing where the user was scheduled to be at a particular time. The media organization app 134 can use this data to develop a better understanding about how to organize content 140 that was acquired at that same time. The app 134 also receives additional information about occurrences and events from the global event database server 190 and the crowd-sourced event data from the media organization server 180. The data from these sources 180, 190 is also very useful to the app 134 as it organizes the content 140.

The app 134 accesses all this content 140, from the same locations in which the data was originally stored by the creating apps 210-260 and organizes it into content clusters using additional data from servers 180 and 190. In most cases, the content 140 is organized based primarily on the metadata 224, 234, 244, 254, 264, and 274 that was attached to the content 140 by the app that created the content 140. In some circumstances, the media organization app 134 can augment the metadata. For instance, the app 134 could use facial recognition (or voice recognition) data 280 available on the mobile device 100 or over the network 170 to identify participants in the content 140. Such recognition can occur using the processor 120 of the mobile device, but in most cases it is more efficient to use the processing power of a cloud content server 192 or the media organization server 180 to perform this recognition. Regardless of where it occurs, any matches to known participants will be used by the app 134 to organize the content 140.

Example Content Clusters, Events, and Presentation Grouping

Figure 3:
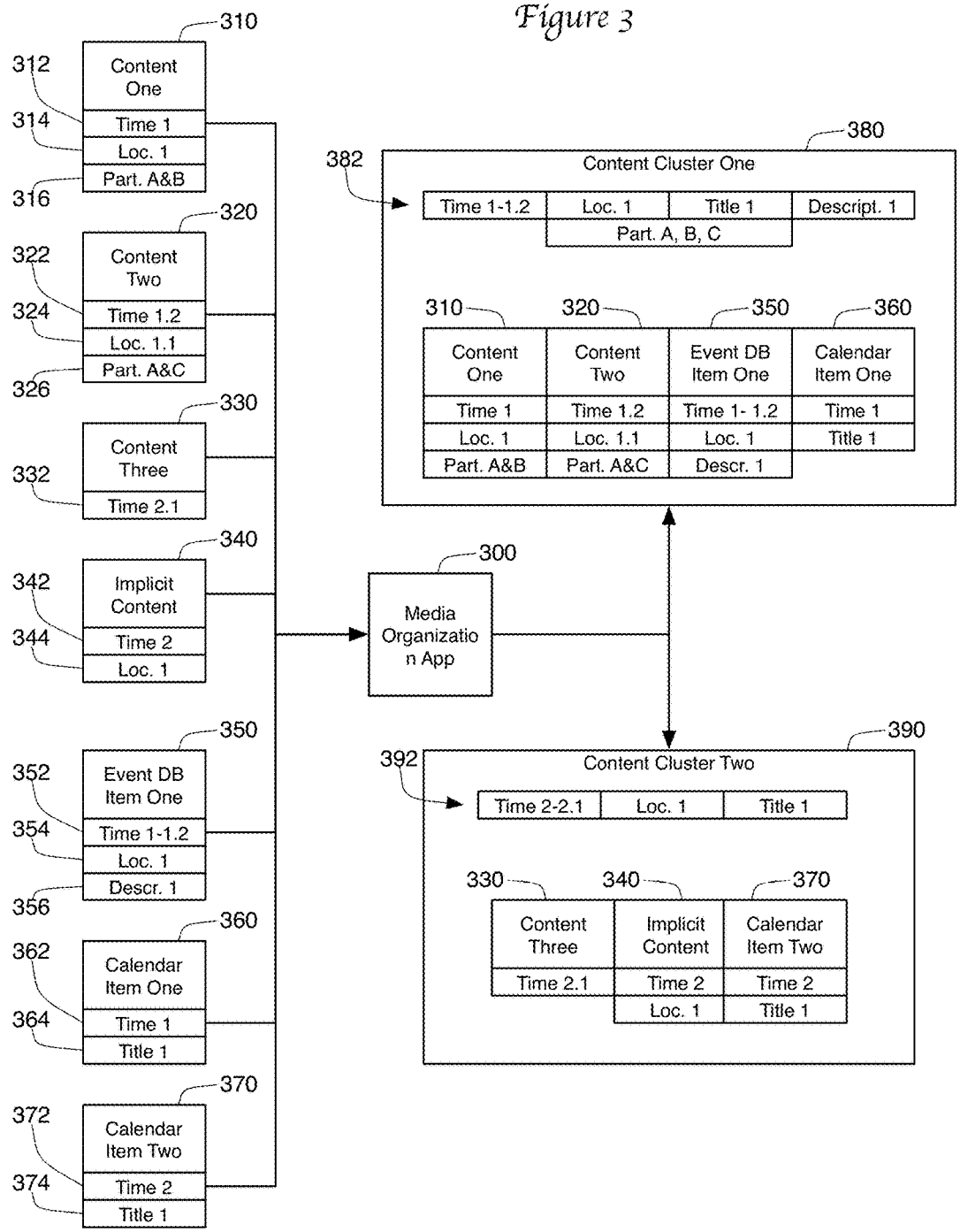
FIG. 3 is a schematic diagram showing content being clustered by a media organization app.

FIG. 3 shows an example of one embodiment of a media organization app 300 organizing a plurality of items 310-370 into two content clusters 380, 390. In this case, there are three items of explicit content, namely content one 310, content two 320 and content three 330. Content one 310 is associated with three items of metadata 312-316, which indicate that content one 310 was acquired at time "Time 1" (312), at location "Loc. 1" (314), and that participants A and B participate in this content (metadata 316). Content one 310 could be, for example, a photograph of A & B, taken at Time 1 and Loc. 1. Similarly, the metadata 322-326 for content two 320 indicates that it was acquired at time "Time 1.2" (slightly later than time "Time 1"), location "Loc. 1.1" (close to but not the same as "Loc. 1"), and included participants A & C. The metadata for content three 330 indicates only that it occurred at time "Time 2.1".

In addition to the three explicit content items 310, 320, 330, the media organization app 300 is also organizing one implicit content item 340, which has metadata indicating that it was taken at time "Time 2" and location "Loc. 1". The media organization app 300 has also obtained data 350 from one of the event database servers 180, 190. This data 350 indicates (through metadata 352-356) that an event with a description of "Descr. 1" occurred at location "Loc. 1" for the duration of "Time 1-1.2". Finally, the app 300 pulled relevant information from the calendar data 212 and discovered two relevant calendar events. The first calendar item 360 indicates that the user was to be at an event with a title of "Title 1" at time "Time 1", while the second calendar item 370 describes an event with a title of "Title 1" at time "Time 2".

The media organization app 300 gathers all of this information 310-370 together and attempts to organize the information 310-370 into content clusters. In this case, the app 300 identified a first cluster 380 consisting of explicit content one 310, explicit content two 320, event database information 350, and calendar item one 360. The media organization app 300 grouped these items of data 310, 320, 350, 360 primarily using time and location information. The app 300 recognized that each of these items occurred at a similar time between "Time 1" and "Time 1.2". Furthermore, to the extent that the items 310, 320, 350, 360 identified a location, the location was either "Loc. 1" or close by location "Loc. 1.1". One advantage of using calendar data 212 or data from event databases 180, 190 is that some of this data 212, 180, 190 will identify not just a single time but an actual time duration. For instance, the calendar data 212 may indicate that a party was scheduled from 6 pm to 2 am. Based on this duration information, the media organization app 300 will be more likely to cluster content from 6 pm and content at 1 am as part of the same event. Similarly, the calendar data 212 may identify a family camping trip that lasts for two days and three nights, which might cause the app 300 to group all content from that duration as a single event.

Once the media organization app 300 identifies items 310, 320, 350, 360 as being part of the cluster 380, it stores this information in media organization data 139 on the mobile device 100. This information may also be stored in the user content 189 stored for the user on the media organization server 180. The information about cluster 380 not only identifies items of data 310, 320, 350, 360, as belonging to the cluster, but also aggregates the metadata from these items into metadata 382 for the entire content cluster 380. This metadata 382 includes metadata from the explicit content 310-320, which indicated that this content within this cluster 380 occurred during the time duration of "Time 1-1.2" and at location "Loc. 1." The metadata from content 310 and 320 also indicated that this content involved participants A, B, and C. In addition, because the media organization app 300 accessed the calendar data 212 and the data from the event database servers 180, 190, the content cluster metadata 282 can also indicate that this content relates to an event with the title "Title 1" having a description "Descr. 1".

The second content cluster 390 grouped together explicit content 330, implicit content 340, and calendar item two 370 primarily because these items 330, 340, 370 all occurred at time "Time 2" or soon thereafter ("Time 2.1") and indicated either that they occurred at the same location ("Loc. 1") or did not indication a location at all. The cluster metadata 392 for this content cluster 390 indicates the time frame ("Time 2-2.1") and location ("Loc. 1") taken from the explicit content 330 and the implicit content 340. The metadata 392 also includes the title "Title 1" from calendar item 2, which was linked with the others items 330, 340 by the common time frame.

An important feature of this embodiment of the present invention is that the clustering of content 380, 390 is done automatically without user involvement. The user only needs to create explicit content 136 with their mobile device 100 using their normal content creation apps 132. These apps 132 save their explicit content 136 as usual. The media organization app 300 can run in the background creating implicit content 138 (pursuant to earlier user instructions or preference settings). At a later time, the media organization app 300 gathers the content 140, makes inquiries from external event databases 180, 190, examines the user calendar data 212, and then creates content clusters 280, 290 for the user. This later time can be when the media organization app 300 is opened by the user and the user requests that the content clustering step occur. Alternatively, this later time can occur periodically in the background. For instance, the user may request through preference settings that the content clustering and database inquiries take place every night between midnight and two a.m., but only when the mobile device 100 is plugged into a power source.

Figure 4:
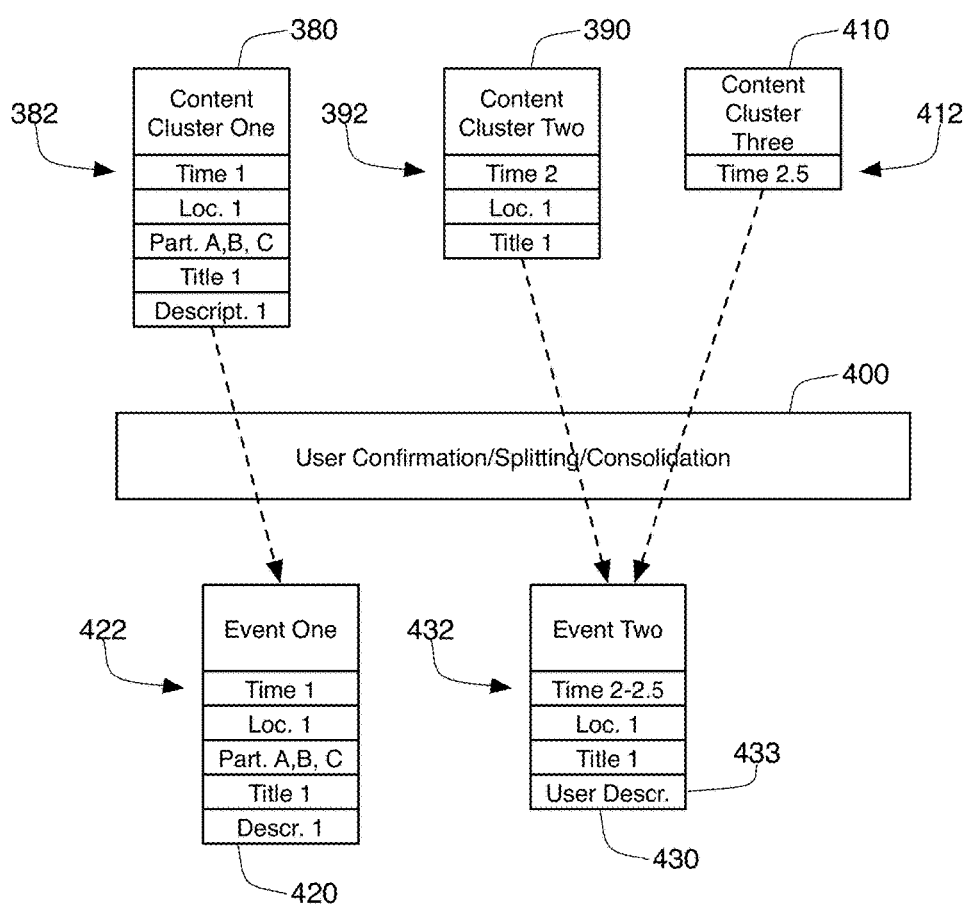
FIG. 4 is a schematic diagram showing content clusters being confirmed as events through a user interface.

Because the content clustering shown in FIG. 2 takes place without user involvement, the media organization app 300 preferably gives the user the right to affirm or correct these clusters 380, 390. In FIG. 4, content cluster one 380, cluster two 390, and a third content cluster 410 are presented to a user through a user interface, represented in FIG. 4 by element 400. The user interface 400 presents these clusters 380, 390, 410 and their contents for the user to review. The user can confirm a cluster as accurate and complete, as this user did with content cluster one 380. When a cluster 380 is confirmed, the media organization app 300 will consider the cluster to be a user-confirmed event, such as event one 420 shown in FIG. 4. Note that event one 420 contains the same metadata 382 that the content cluster 380 had before it was confirmed Sometimes the user will wish to consolidate two different clusters into a single event, or split a cluster into two or more events. In FIG. 4, the media organization app 300 created separate clusters 390, 410, with cluster Two 390 occurring at time "Time 2" and cluster three 410 occurring at time "Time 2.5." While the app 300 viewed these time frames as different enough as to create two separate clusters 390, 410, the user in FIG. 4 chose to combine the separate clusters 390, 410 into a single user-confirmed event two 430. Note that the metadata 432 for event two 430 includes a time frame "Time 2-2.5" derived from the metadata 392, 412 of both of the original content clusters 390, 410. The event two metadata 432 also can contain user added additions, such as the user description 433 of this event 430. Cluster splitting and merging can be performed manually by selecting media content to be included or excluded from an event. The user can also be given the ability to adjust the start and stop times that define the time period of a content cluster, which will automatically include or exclude media content from the cluster. New content clusters can be created from the orphaned content elements.

Each user-defined event includes one or more content items 140 that relate to a particular event that was likely attended by the user. The event might be a wedding, a party with a friend, or a child's swim meet. By clustering the content 140 together into events 420, 430, the user can better appreciate the content 140. Furthermore, these events 420, 430 are enhanced by the addition of implicit content 138, and by the added data from calendar data 212 or one of the event databases 180, 190.

Figure 5:
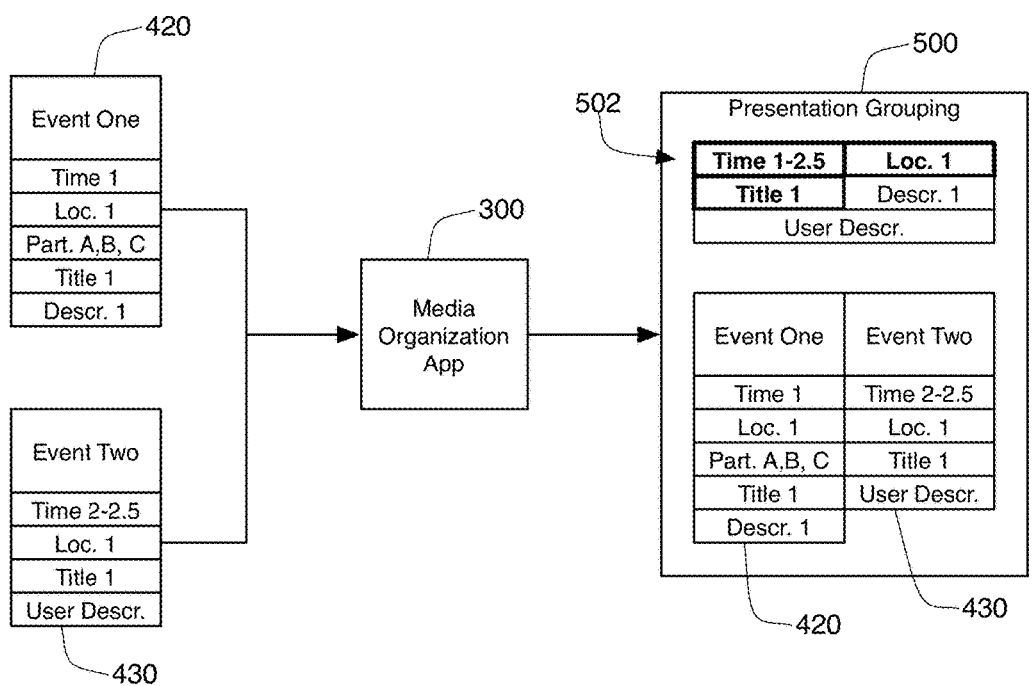
FIG. 5 is a schematic diagram showing events being clustered into a presentation grouping by the media organization app.

In FIG. 5, the media organization app 300 is being used to establish a presentation grouping 500. A presentation grouping 500 is a grouping of two or more events according to a common subject for presentation together. The presentation may be slide show, a video file, a web site, or some unique combination that combines the media from multiple events 420, 430 into a single presentation. Events 420, 430 are grouped together by a common theme or subject. It is possible that some events 420, 430 will be grouped into multiple presentation groupings 500, while other events will not be grouped into any presentation groupings 500.

In FIG. 5, event one 420 is shown having title "Title 1" taken from the calendar item one 360 and event two 430 also has a title of "Title 1" taken from calendar item two 370. The media organization app 300 recognizes this commonality, and then suggests that these two events 420, 430 be combined into a single presentation grouping 500. This grouping 500 contains both events 420, 430, and has metadata 502 taken from the metadata 422, 432 of the two events 420, 430. In FIG. 5, metadata 502 that was shared by all events 420, 430 in the presentation grouping 500 are bolded (namely the timeframe "Time 1-2.5", the location "Loc. 1" and the title "Title 1"), which indicates that these elements in the metadata 502 are most likely to apply to the presentation grouping as a whole 500.

Frequently, many events will be combined into a single presentation grouping 500. For instance, a user may have ten calendar entries all labeled "Third Grade Swim Meet." Although this parent attended all ten swim meets, the parent took pictures (i.e., created explicit media content 136) at only six of these meets. The media organization app 300 will cluster this content 136 into six content clusters, with each cluster also containing a calendar entry with the same "Third Grade Swim Meet" title. Because of this commonality, the app 300 will automatically create a presentation grouping 500 containing content 136 from all six swim meets without including intervening content that is not related to the swim meets.

It is true that, in the example shown in FIG. 5, these two events 420, 430 may not have been grouped in a single presentation grouping 500 if the user had not created calendar entries with the same title "Title 1" for each event. While they shared the same location ("Loc. 1"), this might not have been enough commonality for the app 300 to group the events 420, 430 together. However, if these events were swim meets and were sponsored by an organization that posted every meet in the global event database server 190, this presentation grouping 500 could still be created. As long as one item in a cluster identifies a location and another identifies a time, then the global event database server 190 should be able to identify any events were scheduled at the same location and time. The server 190 could also prompt the user to select from a list of choices based on the known events near the location within the relevant time frame. Each event 420, 430 would then include the identification of the event received from the global event server 190, and the media organization app 300 would be able to group the same events 420, 430 as a presentation grouping 500.

Alternatively, another parent of a child in the third grade swim team may have created and labeled events using the media organization app 300. When this data was uploaded to the media organization server 180, the server 180 would now have knowledge of these swim meets. When the next user attempts to cluster content taken at the same swim meets, the media organization app 300 would query the server 180 and receive an identification of these swim meets, which would be added into their own events 420, 430.

Methods

Figure 6:
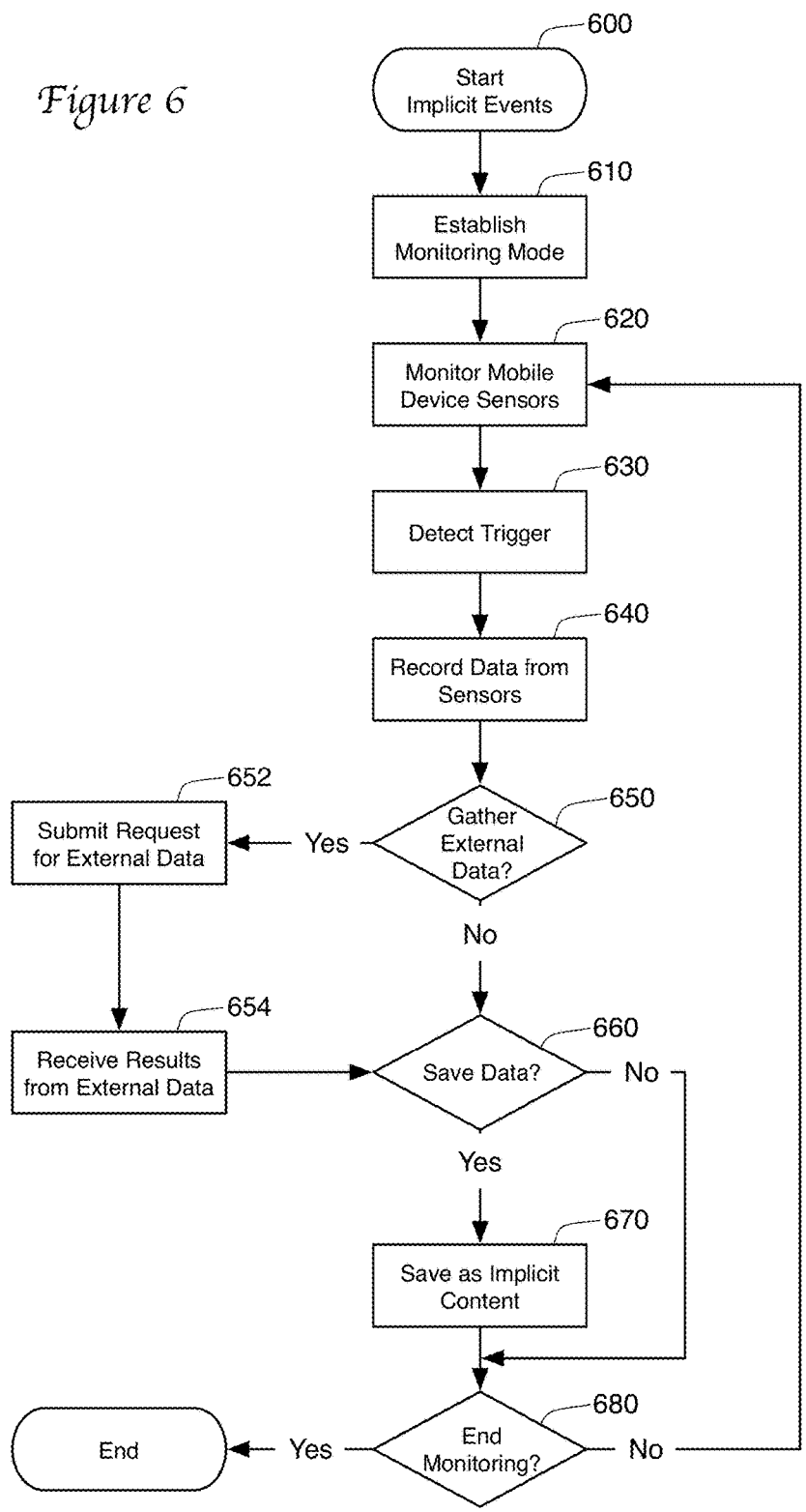
FIG. 6 is a flow chart showing a method for generating implicit content.

FIG. 6 shows a method 600 that is used to create implicit content 138 on the mobile device 100. The method begins at step 610, during which a user selects a particular mode to be used to monitor the sensors 150 of the mobile device 100. The selected monitoring mode establishes which of the sensors 150 will be monitored by the method 600, and also establishes a trigger that will be use to start recording data. For example, a walking tour mode could be established in which an accelerometer is routinely (every few seconds) measured to determine whether an individual is currently walking (or running). A trigger event could be defined to detect a change in the walking status of the individual (e.g., a user who was walking is now standing still, or vice versa). Alternatively, the trigger could require that the change in status last more than two minutes. This alternative walking tour mode would be designed to record when the user starts walking or stops walking, but would not record temporary stops (for less than two minutes). So a user that is walking down a path may meet a friend and talk for ten minutes, and then continue down the path. When the user reaches a restaurant, the user stops, has lunch, and then returns home. This mode would record when the user started walking, when the user stopped to talk to a friend, when the user started again, when the user ate lunch, when the user finished lunch and started walking home, and when the user returned home. This mode would not record when the user stopped to get a drink of water (because the user stopped for less than two minutes), or when the user got up at lunch to wash his hands (because the user walked for less than two minutes). Other modes might include a car trip mode, which would monitor an accelerometer and GPS device to record car stops that lasted longer than an hour, or a lunch conversation mode, which randomly monitors the microphone to listen for human voices and records one minute of the conversation if voices are recognized. The point of selecting a monitoring mode in step 610 is to ensure that the user approves of the monitoring of the sensors 150 that must be done to create implicit content 138, and that the user desires to create this type of content 138.

Once the mode is established, the processor 120 will monitor the sensors 150 of the mobile device 100 at step 620 looking for a triggering event. The sensors 150 to be monitored and the triggering event will be determined by the selected monitoring mode. If the processor 120 detects a trigger at step 630, the processor 120 will record data from the sensors 150 in step 640. Note that the data recorded from the sensors 150 does not have to be limited to, or even include, the sensor data that was used to detect the trigger in step 630. For instance, the triggering event may be that the user took their cellular phone 100 out of their pocket. This could be determined by monitoring the accelerometer 160 and the ambient light sensor 164. When this occurs, the processor 120 might record the location of the device 100 as indicated by the GPS sensor 158, the current time as indicated by the clock 156, and the next two minutes of conversation as received by the microphone 154.

Step 650 determines whether data from external sources are to be included as part of this implicit content 138. Such data may include, for example, the weather at the currently location of the device 100, or the presence of mobile devices 100 belonging to friends in the general proximity. If step 650 determines that external data will be included, a request for external data is made in step 652, and the results of that request are received in step 654. For example, the media organization app 134 might request local weather information from another app on the mobile device 100 or from a weather database 194 accessible over the network 170. Alternatively, a "locate my friends" app that detects the presence of mobile devices belong to a user's friend could be requested to identify any friends that are nearby at this time. The data from these apps or remote servers is received at step 654, and combined with the data recorded from the sensors 150 at step 640.

At step 660, a determination is made whether to save this accumulated data. In some circumstances, a monitoring mode may establish that the data gathered after a triggering event (step 630) is always to be stored as an implicit content 138. In other circumstances, the monitoring mode may impose requirements before the data can be saved. For instance, the lunch conversation mode may not save the recorded audio as implicit content 138 if analysis of the recording indicates that the voices would be too muffled to be understood. If the condition for saving the data under the monitoring mode is met at step 660, then the data (including both sensor data recorded at step 640 and external data received at step 654) is recorded as implicit content at 670. If the step 660 determines that the condition is not met, step 270 is skipped. At step 680, the process 600 either returns to monitoring the device sensors 150 at step 620, or ends depending on whether additional monitoring is expected by the monitoring mode.

Figure 7:
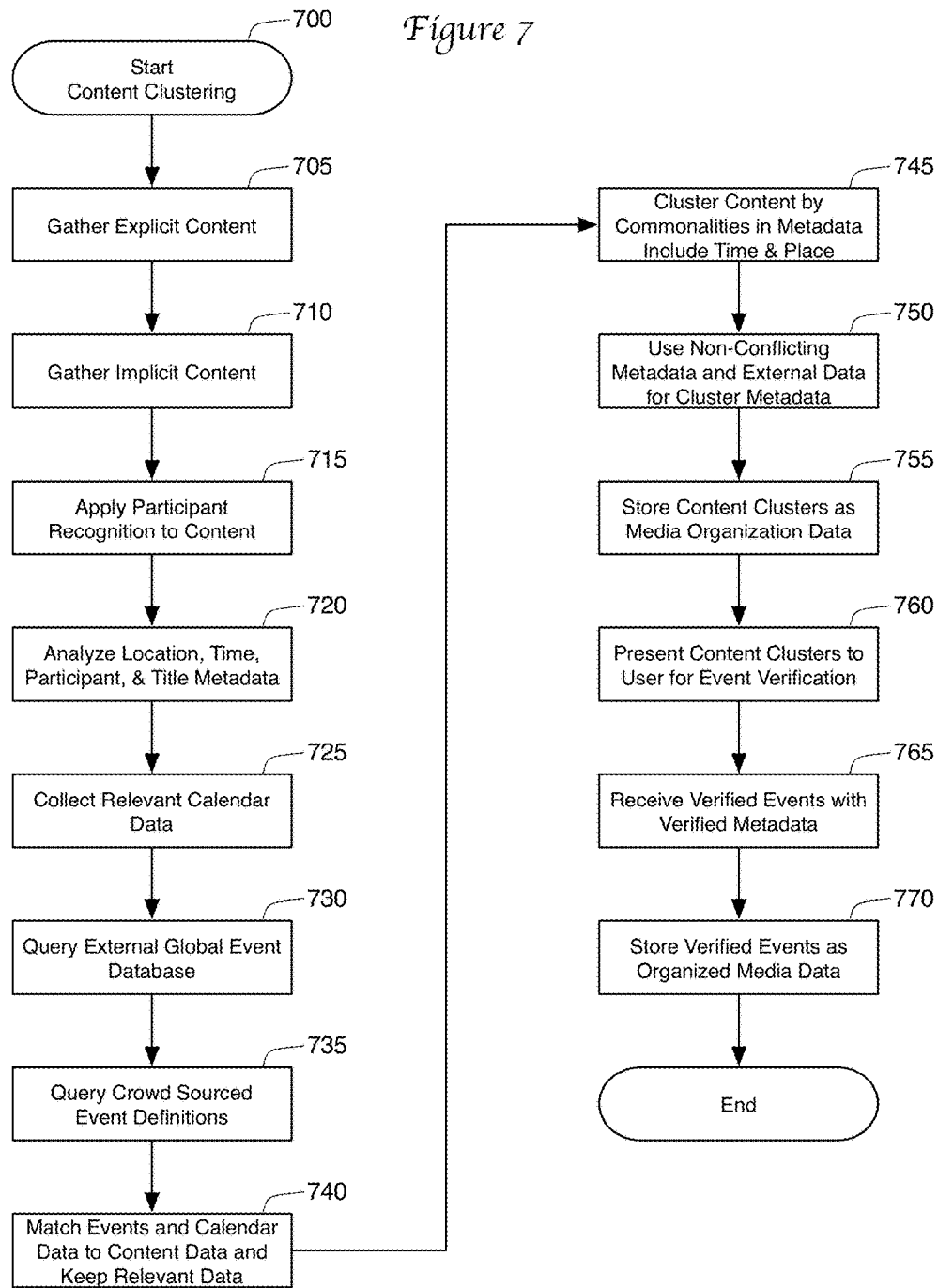
FIG. 7 is a flow chart showing a method for content clustering.

FIG. 7 shows a method 700 for clustering content 140 into content clusters. The process 700 starts at step 705 by gathering the explicit content 136 from the memory 130 on the mobile device 100, a cloud storage server 192, or both. Next the implicit content 138 is gathered at step 710, again either from memory 130 or from user content storage 189 at server 180. These steps 705, 710 may gather all information available at these data locations, or may only search for new content 140 added since the last time the app 134 organized the content 140.

At step 715, the media organization app 134 accessing facial or voice recognition data 280 in order to supplement the participant information found in the metadata for the gathered content 140. Of course, this step 715 could be skipped if participant information was already adequately found in the metadata for the content 140, or if no participant recognition data 280 were available to the app 134.

At step 720, the media organization app 134 analyses the metadata for the content 140, paying particular attention to location, time, participant, and title metadata (if available) for the content 140. Using the time information taken from the content 140, the app 134 analyzes the calendar data 212 looking for any calendar defined events that relate to the content 140 being analyzed (step 725). In addition, the app 134 uses time and location information from the content 140 to search for occurrence information from one or more third party event databases 190 (step 730). The app 134 also makes a similar query at step 735 to the crowd-sourced event definitions maintained by the media organization server 180. If the calendar data or the responses to the queries made in steps 730, 735 contain data that is relevant to the content 140 being analyzed, such data will be included with the content 140 at step 740.

At step 745, the content 140 and the relevant data from steps 725-735 are clustered together by comparing metadata from the content 140 and the added data. In one embodiment, clusters are based primarily on similarities in time metadata. In this embodiment, the app 134 attempts to group the content 140 by looking for clusters in the time metadata. In other embodiments, location metadata is also examined, whereby the app 134 ensures that no content cluster contains data from disparate locations.

At step 750, metadata is created for the content clusters by examining the metadata from the content 140 and the additional data obtained through steps 725-735. The clusters are then stored in the media organization data 139 in memory 130, in the user content 189 of the media organization server 180, or both.

At step 760, the automatically created content clusters are presented through a user interface to a user for confirmation as user-confirmed events. The user can confirm a cluster without change as an event, can split one cluster into multiple events, or combine two or more clusters into a single event. The app 134 receives the verified events from the user interface at step 765. The user can also confirm and supplement the metadata, adding descriptions and tags to the metadata as the user sees fit. Finally, the verified events are saved in step 770 with the media organization data 139 in memory 130, and/or in the user content 189 of the media organization server 180. As explained above, these data locations 139, 189 can be designed to hold only the organizational information for the content 140 while the content 140 itself remains in its original locations unaltered. Alternatively, all of the organized content 140 can be gathered and stored together as user content 189 stored at the media organization server 180. While this would involve a large amount of data transfer, the media organization app 134 can be programmed to upload this data only in certain environments, such as when connected to a power supply, with access to the Internet 170 via Wi-Fi Network Interface 144, and only between the hours of midnight and 5 am. Alternatively, this data could be uploaded continuously to the remote media organization server 180 in the background while the mobile device 100 is otherwise inactive or even while the device 100 is performing other tasks.

Figure 8:
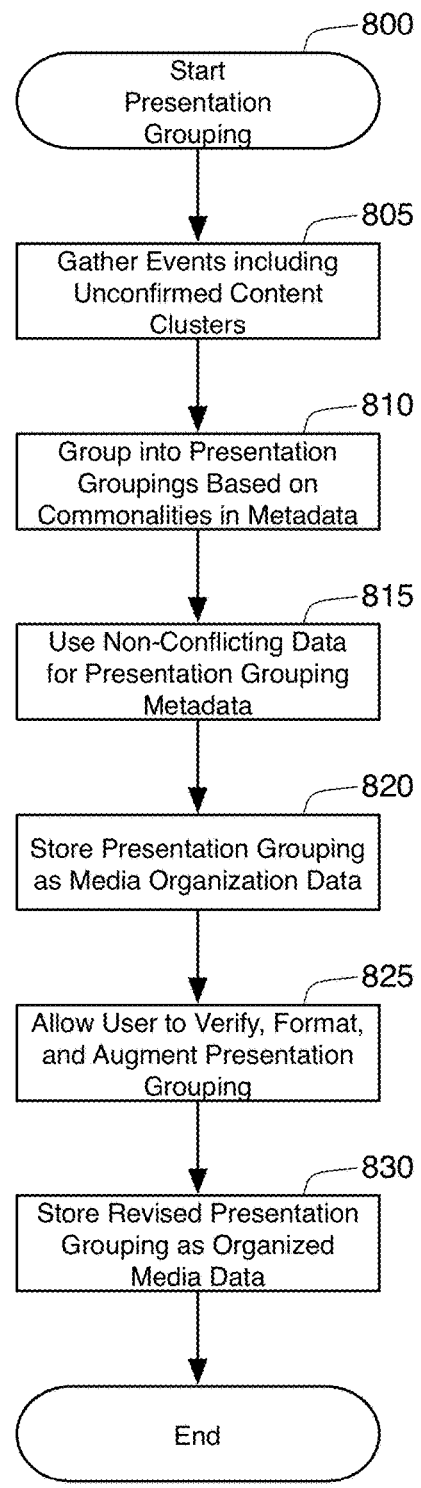
FIG. 8 is a flow chart showing a method for the grouping of events into presentation groupings.

FIG. 8 shows a method 800 for grouping events into presentation groupings. This method 800 starts at step 805, wherein events are identified by the media organization app 134 for grouping. Step 805 might be limited to clusters that have formally become user-verified events through steps 765 and 770. Alternatively, the process 800 may include unverified content clusters stored at step 755. At step 810, the app 134 examines the metadata for each event and cluster, and then attempts to find commonalities between the events and clusters. As explained above, these commonalities can frequently be based upon event information obtained from calendar data 212 or from data obtained by outside event data 180, 190.

In one embodiment, step 810 uses commonality in the metadata that does not relate to closeness-in-time. The reason for this is that content that was collected close to the same time as other similar content would, in most cases, have already been clustered together into events. Consequently, it is likely that the separate events being grouped together into a presentation grouping would not share a common time with one another. However, it may be useful to recognize commonalities in the time metadata that are not related to closeness-in-time. For instance, the app 134 may recognize that numerous content clusters or events occur on Thursday evenings from 6 pm to 8 pm. The app 134 may recognize this as a connection between the events, and therefore propose combining all events that occur on Thursday evenings from 6 pm to 8 pm as part of a presentation grouping.

At step 815, the app 134 uses the metadata from the combined events to create metadata for the presentation groupings. The presentation groupings and metadata are then stored at step 820 in the media organization data 139 or in the user data 189 on server 180.

At step 820, the user is allowed to verify the presentation groupings created at step 810. The user is given the ability to add events or content 140 directly to a presentation grouping, or to remove events or content 140 from the presentation grouping. The user is also given the ability to modify the metadata, and to format the presentation grouping as desired by the user. As explained above, the presentation grouping may be used to create a web site, a slide show, or a video presentation of the combined content. As a result, numerous formatting options will be available to a user at step 825 to format the presentation grouping. At step 830, the user modifications to the presentation groupings are stored at locations 139 or 189, and the process 800 ends.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A mobile communication device comprising:
   a) a processor that is controlled via programming instructions;
   b) a non-transitory computer readable memory;
   c) a user input device for receiving explicit input instructions from a user;
   d) a camera sensor;
   e) a non-camera sensor selected from a group consisting of an accelerometer, a gyroscope, and a location identifying sensor;
   f) explicit content generation programming stored on the memory and performed by the processor, the explicit content generation programming causing the processor to respond to an explicit input instruction from the user input device by storing image content on the memory, the image content including:
      i) an image file recorded by the camera sensor, and
      ii) image time metadata indicating the time at which the image file was captured;
   g) implicit content generation programming stored on the memory and performed by the processor, the implicit content generation programming causing the processor to:
      iii) monitor the non-camera sensor;
      iv) identify a change in the non-camera sensor;
      v) in response to the change in the non-camera sensor, storing implicit content on the memory, the implicit content including
         (1) an indication of the change in the non-camera sensor, and
         (2) implicit time metadata identifying the time at which the change in the non-camera sensor was identified;
   h) after steps f) and g), content clustering programming that groups the previously created image content and the previously created implicit content into a cluster based on similarities between the image time metadata and the implicit time metadata;
   i) a network interface allowing data connections with a remote computing device over a wide area network; and
   j) remote event querying programming stored on the memory and performed by the processor, the remote event querying programming causing the processor to:
      vi) query a remote occurrences database over the network interface, the query identifying the cluster time and the cluster location,
      vii) receive occurrence data from the remote occurrences database concerning an occurrence that occurred at the cluster time and cluster location;
   wherein the occurrence data is added to the cluster metadata;
   wherein the content clustering program generates an organized media file on the memory having cluster metadata identifying a time and a location for the cluster, the organized media file identifying the image content and the implicit content as part of the cluster; and
   wherein the memory contains a plurality of image content each having a separate image time metadata, and further wherein the content clustering programming uses the occurrence duration received with the occurrence data to define a time period that determines which of the plurality of image content is included in the content cluster.

2. A mobile communication device comprising:
   a) a processor that is controlled via programming instructions;
   b) a non-transitory computer readable memory;
   c) a user input device for receiving explicit input instructions from a user;
   d) a camera sensor;
   e) a non-camera sensor selected from a group consisting of an accelerometer, a gyroscope, and a location identifying sensor;
   f) explicit content generation programming stored on the memory and performed by the processor, the explicit content generation programming causing the processor to respond to an explicit input instruction from the user input device by storing image content on the memory, the image content including:
      i) an image file recorded by the camera sensor, and
      ii) image time metadata indicating the time at which the image file was captured;
   g) implicit content generation programming stored on the memory and performed by the processor, the implicit content generation programming causing the processor to:
      iii) monitor the non-camera sensor;
      iv) identify a change in the non-camera sensor;
      v) in response to the change in the non-camera sensor, storing implicit content on the memory, the implicit content including
         (1) an indication of the change in the non-camera sensor, and
         (2) implicit time metadata identifying the time at which the change in the non-camera sensor was identified;
   h) after steps f) and g), content clustering programming that groups the previously created image content and the previously created implicit content into a cluster based on similarities between the image time metadata and the implicit time metadata;
   wherein the explicit content generation program creates a plurality of still image files and a plurality of video image files on the memory, wherein each still image file and each video image file is stored with image time metadata indicating the time at which the camera sensor captured the image file;
   wherein the implicit content generation programming creates a plurality of implicit content files on the memory, wherein each implicit content file is stored with implicit time metadata identifying the time at which the change in the non-camera sensors was noted that caused the creation of the implicit content file; and
wherein the content clustering program generates an organized media file on the memory, the organized media file identifying a plurality of content clusters, each content cluster consisting of still image files, video image files, and implicit content files.

3. A method for organizing media files on a mobile device comprising:
   a) accessing visual media files previously taken by an image sensor on the mobile device and accessing audio media files previously taken by a microphone on the mobile device, wherein the media files each have time metadata and location metadata;
   b) analyzing, using a processor on the mobile device, time metadata and location metadata for the media files to find commonalities in the metadata;
   c) clustering, using the processor, the media files into media clusters without user involvement, the clustering being based both upon commonalities in the time metadata and commonalities in the location metadata; and
   d) establishing for each media cluster, using the processor and without user involvement, cluster metadata, wherein the cluster metadata includes time metadata that specifies a time duration spanning the time metadata of all of the media files in the media cluster, further wherein the cluster metadata includes location metadata based on commonalities in the location metadata for all of the media files in the media cluster; and
   f) grouping, using the processor, a plurality of the media clusters into a presentation grouping without user involvement, the presentation grouping being based upon commonalities in the metadata of the plurality of media clusters.

4. The method of claim 3, further comprising accessing calendar event data maintained by a calendar program on the mobile device, further wherein the clustering step also clusters the calendar event data into the media clusters based on commonalities between the time and location metadata of the media files and time and location information stored in the calendar event data, further wherein the commonalities in the metadata used for the grouping of the plurality of media clusters originates in the calendar event data.

5. The method of claim 3, wherein the presentation grouping and the plurality of media clusters are stored on remote storage accessible to the processor on the mobile device over a network interface and a wide area network.

6. The method of claim 5, wherein all of the media content from the media files within the plurality of media clusters is stored on the remote storage.

7. The method of claim 3, further comprising:
   g) submitting a query to a remote occurrences database over a network interface of the mobile device, the query identifying a cluster time and a cluster location for a particular media cluster; and
   h) receiving occurrence data from the remote occurrences database, the occurrences data identifying a occurrence name for an occurrence in the occurrences database that occurred at the cluster time and cluster location;
   i) storing the occurrence name as a name for the particular media cluster within the presentation grouping.

8. The method of claim 7, wherein the occurrence data further includes a duration for the occurrence, wherein the clustering step uses the duration for the occurrence to establish a time frame for media cluster.

9. The method of claim 3, further comprising:
   g) providing a user interface on the mobile device for a user to combine, divide, and accept the media clusters to create user-accepted events each comprising a plurality of media files, further wherein each user-accepted event contains event metadata that is used to group the user-accepted events into the presentation grouping.

10. The method of claim 9, further comprising:
    h) identifying participants in the user-accepted events by identifying participants in the media files in the user-accepted events.

11. The method of claim 9, wherein the event metadata comprises an event title, event participants, event location, and event time.

12. The method of claim 11, wherein the step of creating event metadata further comprises accessing calendar event data maintained by a calendar program on the mobile device to identify a calendar event for the event time and using data associated with the calendar event to create the event metadata.

13. The method of claim 11, wherein the step of creating event metadata further comprises:
    i) submitting a query to a remote occurrences database over a network interface of the mobile device, the query identifying a first event time and a first event location; and
    ii) receiving occurrence data from the remote occurrences database for an occurrence stored at the remote occurrences database that occurred at the first event time and the first event location; and
    iii) using the occurrences data to create event metadata for a first event.

14. The method of claim 13, further comprising:
    h) submitting event metadata over to the remote occurrences database to be added to the database.

15. The method of claim 11, further comprising:
    h) accessing event metadata for a plurality of user-accepted events;
    i) analyzing, using the processor on the mobile device, the event metadata to find commonalities in the event metadata;
    j) generating a presentation grouping of a plurality of user-accepted events based upon commonalities discovered in the event metadata.

16. The method of claim 15, wherein the commonalities discovered in the event metadata relate to an event type metadata retrieved from querying a remote occurrences database.

17. The method of claim 15, wherein the commonalities discovered in the event metadata relate to similarities in textual location descriptions in the metadata.

18. The method of claim 15, wherein the commonalities discovered in the event metadata relate to event participants metadata.

19. The method of claim 15, wherein the commonalities discovered in the event metadata relate to metadata that originated in calendar event data.

20. The method of claim 3, further comprising:
    e) generating implicit content files by:
       i) monitoring a non-camera sensor on the mobile device,
       ii) identifying a change in the non-camera sensors, and
       iii) in response to identifying the change, generating an implicit content file containing an identification of the identified change and also containing implicit metadata identifying the time and location at which the change in the non-camera sensors was identified;

wherein the clustering step further clusters the media files with the implicit content files in the media clusters based on commonalities between the implicit metadata and the time metadata and location metadata of the media files.

* * * * *